United States Patent [19]
Hermle

[11] 3,735,664
[45] May 29, 1973

[54] METAL WASHER FOR AN ANCHORING MEMBER

[75] Inventor: Werner Hermle, Schaanwald, Liechtenstein

[73] Assignee: Hilti Aktiengesellschaft, Schaan, Liechtenstein

[22] Filed: June 10, 1971

[21] Appl. No.: 151,821

[30] Foreign Application Priority Data

June 11, 1970 Germany................P 20 28 876.0

[52] U.S. Cl. ................85/10 E, 85/50 R, 102/93, 227/139
[51] Int. Cl. ....A43b 23/20, F16b 19/14, F16b 43/00
[58] Field of Search................85/10 E, 10 R, 8.8, 85/8.6, 36, 32 V, 50 R; 102/93; 227/139; 151/35, 37

[56] References Cited

UNITED STATES PATENTS

| | | | |
|---|---|---|---|
| 1,316,084 | 9/1919 | Dake | 151/37 |
| 2,380,204 | 7/1945 | Turechek | 85/10 E UX |
| 3,269,238 | 8/1966 | Whistler, Sr. et al. | 85/36 X |
| 3,516,323 | 6/1970 | O'Brien | 85/10 E |
| 3,561,792 | 2/1971 | Cycowicz | 85/50 R X |

FOREIGN PATENTS OR APPLICATIONS

| | | | |
|---|---|---|---|
| 85,271 | 6/1920 | Switzerland | 151/37 |

Primary Examiner—Ramon S. Britts
Attorney—Toren & McGeady

[57] ABSTRACT

A metal washer with resilient tabs extending from its circumferential periphery is used to support an anchoring member, such as a stud, bolt and the like within the barrel of a stud setting apparatus. The tabs have a thickness less than the washer and the roots of the tabs are located inwardly from the circumferential periphery of the remainder of the washer. Preferably, the tabs are equiangularly spaced about the periphery of the washer and the tabs and washer are formed from a single piece of metal. When positioned on the shank of an anchoring member and inserted into the barrel of a stud setting apparatus, the tabs are bent out of the plane of the washer and provide a resilient support in contact with the surface of the barrel.

5 Claims, 3 Drawing Figures

INVENTOR
WERNER HERMLE

BY Toren and McGeady
ATTORNEYS

METAL WASHER FOR AN ANCHORING MEMBER

SUMMARY OF THE INVENTION

The present invention is directed to a metal washer for supporting an anchoring member within the barrel of a stud setting apparatus and, more particularly, it concerns the formation of the metal washer with one or a plurality of tabs extending radially outwardly from its circumferential periphery.

In stud setting apparatus for driving an anchoring member, such as a stud, bolt or the like, into a hard target material, and particularly in apparatus containing a barrel, it is necessary to retain or hold the anchoring member within the barrel. To provide the requisite retaining action, various retention elements have been known, some of the retention elements are formed within the barrel or on the apparatus itself and others are provided on the anchoring member when it is inserted into the barrel.

Magnets, springs, ball detents and the like have been formed or provided within a stud setting apparatus for holding an anchoring member in place prior to its insertion by the apparatus. Normally such retention elements are arranged in the forward end of the barrel in the apparatus. However, retention elements formed in the apparatus itself are relatively costly and require a certain amount of attention from the operator and the tendency is to provide the anchoring member with its own retention element. It has been known to use steel guide washers on anchoring members and also to employ plastic washers provided with friction cams. Further, steel washers are available which are coated with plastic, cardboard and the like so that the friction of this additional layer projecting from the washer in contact with the barrel wall ensures the retention of the anchoring member within the barrel until it is ready to be driven into a target material. In the past, retention elements positioned on the anchoring member have had the disadvantage that the guiding and retention action has required the use of two different elements formed of different materials. Moreover, plastic washers have the disadvantage that due to inevitable deformation or to incomplete separation during the insertion of the anchoring member, an unfavorably appearing anchoring assembly is provided after the completion of the insertion operation.

The primary object of the present invention is to provide a washer which combines, in itself, the functions of both guiding and retaining an anchoring member, while avoiding the disadvantages experienced in retaining elements used in the past.

Therefore, in accordance with the present invention, a washer is provided with one or more elastic retention tabs extending radially outwardly from the periphery of the remainder of the washer.

When the washer, in accordance with the present invention, is inserted onto an anchoring member and the anchoring member is placed into the barrel of a stud setting apparatus, the resilient retention tabs bend in a direction counter to the direction of insertion and a resulting wedging is effected between the tabs and the inner wall of the barrel. The action of the tabs against the barrel surface prevents the anchoring member from being displaced until it is driven into a target material by the apparatus. Further, such washers not only provide a good retaining action but also afford suitable guidance for the anchoring member.

To keep the force required for placing the anchoring member within the barrel of a setting apparatus as low as possible, while maintaining the required spring effect of the retention tabs, the thickness of the tabs is maintained small compared to the thickness of the remainder of the washer.

Preferably, the washer and its retention tabs are formed from a single piece of metal so that it is simple to form the retaining member, particularly with a follow-on cutting tool.

To obtain a spring arm which is as long as possible and thereby afford good resilient properties for the retention tabs, the roots of the tabs extend radially inwardly from the circumferential periphery of the remainder of the washer.

In a preferred embodiment of the invention, three equiangularly spaced retention tabs are formed on the washer so that a proven three-point support is provided for an anchoring member within the barrel of a stud setting apparatus.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

DETAILED DESCRIPTION OF THE INVENTION

Figure 1:
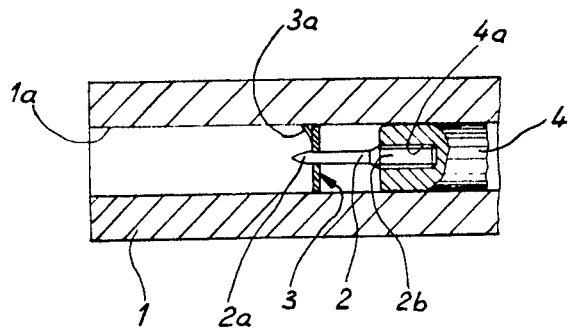
FIG. 1 is an axially extending cross-sectional view through the barrel of a stud setting apparatus illustrating a washer, in accordance with the present invention, positioned on an anchoring member.

In FIG. 1, the forward portion of a barrel 1 of a stud setting apparatus is shown with an anchoring member 2 in position to be driven into a hard target material, such as concrete, steel and the like. The anchoring member 2 is positioned within the barrel 1 by means of a washer 3 placed on the member and spaced closely from its tip 2a. In FIG. 1, a single retention tab 3a is shown bent out of the plane of the washer 3 due to the force exerted in inserting the bolt into the barrel. While only a single retention tab 3a is shown in FIG. 1, it will be noted in FIG. 2 that the washer is provided with three such tabs, 3a, 3b and 3c, spaced equiangularly about the periphery of the washer. Since the radially outer ends of the tabs extend outwardly beyond the circumferential periphery of the remainder of the washer, the tabs are displaced from the plane of the washer when inserted into the barrel and are tensioned and wedged against the inner wall 1a of the barrel. The trailing end 2b of the anchoring member 2 is guided within a bore 4a formed in a piston 4 located within the barrel 1.

Figure 2:
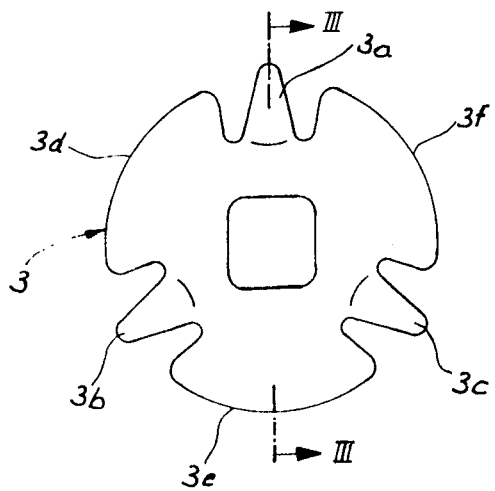
FIG. 2 is a plan view, on an enlarged scale, of the washer shown in FIG. 1.
Figure 3:
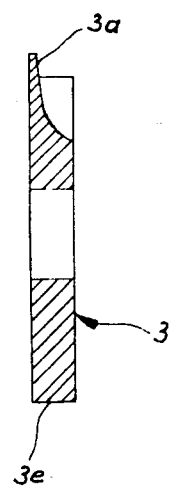
FIG. 3 is a sectional view taken along the line III—III in FIG. 2.

As can be seen in FIGS. 2 and 3, the tabs 3a, 3b and 3c project outwardly beyond the periphery of the washer while the root of the tabs is spaced radially inwardly from the periphery of the remainder of the washer. As indicated in FIG. 3, the thickness of the tabs is considerably smaller than that of the remainder of the washer so that the tabs have a form resembling a leaf spring.

When the member 2 with the washer 3 positioned near its tip 2a is inserted into the barrel 1 of the stud setting apparatus, the tabs 3a, 3b and 3c are bent in the direction opposite to the direction of the insertion of the anchoring member into the barrel, note FIG. 1. As a result, a wedging action takes place against the inner wall 1a of the barrel in a direction counter to the driving direction of the anchoring member 2. Accordingly, the anchoring member 2 can be wedged into any desired position in the barrel and can no longer fall out. During the insertion or driving action, the wedge effect of the retention tabs 3a, 3b and 3c is overcome by the force applied in the driving direction by the stud setting apparatus and the tabs then lose their retaining effectiveness and the guide surfaces 3d, 3e and 3f on the circumferential periphery of the remainder of the washer provide the requisite guiding action as the bolt is driven from the barrel.

While a specific embodiment of the invention has been shown and described in detail to illustrate the application of the inventive principle, it will be understood that the invention may be embodied otherwise without departing from such principles.

What is claimed is:

1. A metal washer for supporting an anchoring member, such as a bolt, stud and the like, within the barrel of a stud setting apparatus from which the anchoring member is driven into a hard target material, such as concrete, steel and the like, said washer having a flat configuration with an opening centrally arranged therethrough for an anchoring member, wherein the improvement comprises that said washer has a circumferential peripheral edge having a diameter such that said peripheral edge affords a guiding action on the surface of the barrel for the anchoring member as it is driven from the barrel, at least one resilient tab formed on said washer and arranged in the plane of said washer, said tab extending radially outwardly beyond said peripheral edge so that when inserted into the barrel of the stud setting apparatus the radially outer end of said tab deflects out of the plane of said washer and resiliently supports the anchoring member within the barrel, and said tab having side edges extending inwardly from its radially outer end to a point on said washer spaced radially inwardly from said circumferential peripheral edge, the radial extent of said tab radially inwardly of said circumferential peripheral edge being at least equal to the radial extent of said tab radially outwardly of said edge.

2. A metal washer, as set forth in claim 1, wherein said tab having a thickness dimension in the axial direction of said washer which is less than the corresponding thickness dimension of said washer.

3. A metal washer, as set forth in claim 1, wherein said washer and tab being formed as a unitary member.

4. A metal washer, as set forth in claim 1, wherein three said tabs are formed on and are positioned at equiangularly spaced locations about said washer.

5. A metal washer, as set forth in claim 4, wherein the sides of each said tab are arranged converging toward one another in the direction toward the radially outer end thereof and a recess formed on each side of each said tab projecting inwardly from said circumferential peripheral edge to the radially inner end of said tab.

* * * * *